United States Patent
Lagares Corominas

(10) Patent No.: US 7,037,186 B2
(45) Date of Patent: May 2, 2006

(54) MACHINE FOR TENDERISING MEAT MORSELS

(75) Inventor: Narcís Lagares Corominas, Girona (ES)

(73) Assignee: Metalquimia, S.A., Girona (ES)

( * ) Notice: Subject to any disclaimer, the term of this patent is extended or adjusted under 35 U.S.C. 154(b) by 16 days.

(21) Appl. No.: 10/471,962

(22) PCT Filed: Mar. 15, 2002

(86) PCT No.: PCT/ES02/00127

§ 371 (c)(1),
(2), (4) Date: Mar. 17, 2004

(87) PCT Pub. No.: WO02/074092

PCT Pub. Date: Sep. 26, 2002

(65) Prior Publication Data

US 2004/0152406 A1    Aug. 5, 2004

(30) Foreign Application Priority Data

Mar. 16, 2001 (ES) ................. 200100627

(51) Int. Cl.
*A22C 21/00* (2006.01)
(52) U.S. Cl. .................................... 452/144
(58) Field of Classification Search ............. 452/141, 452/144, 145, 146
See application file for complete search history.

(56) References Cited

U.S. PATENT DOCUMENTS

| | | | |
|---|---|---|---|
| 2,697,850 A | 12/1954 | Cross ..................... 452/47 |
| 3,022,745 A | 2/1962 | Roberts ................... 104/99 |
| 3,533,495 A | 10/1970 | Wallace | |
| 3,964,129 A | 6/1976 | Townsend | |
| 4,060,875 A | 12/1977 | Gosling et al. | |
| 4,079,666 A | 3/1978 | Plemons et al. ............. 99/355 |
| 4,112,546 A | 9/1978 | Muller | |
| 4,129,923 A | 12/1978 | Hoegger ................... 452/46 |
| 4,216,566 A * | 8/1980 | Bettcher .................. 452/141 |
| 4,218,003 A | 8/1980 | Plewa et al. ............... 452/31 |
| 4,547,931 A | 10/1985 | Staudenrausch et al. ...... 17/1 F |
| 4,565,282 A | 1/1986 | Olsson et al. ............. 198/778 |
| 4,582,047 A | 4/1986 | Williams ................ 126/369 |

(Continued)

FOREIGN PATENT DOCUMENTS

DE    3137276    4/1983

(Continued)

OTHER PUBLICATIONS

Article, "Continuous Process Systems", Alkar, http://www.alkar.com (date unavailable; believed to be dated before Mar. 1, 2002) pp. 1-3.

(Continued)

*Primary Examiner*—Thomas Price
(74) *Attorney, Agent, or Firm*—Jacobson Holman PLLC

(57) ABSTRACT

It comprises a bench (12) supporting a longitudinal propping floor (1) provided with means to make said meat pieces are intermittently moved forwards along it, at least a tenderizing group (6) provided with sabres (7) uprightly moveable to stab the meat pieces on the floor (1) and at least a hammering group (4) provided with a stamping member (5) uprightly moveable to hit the meat pieces on said floor (1), said intermittently moving forwards means, said hammering group (4) and said tenderizing group (6) being connected to independent driving means (19, 10a, 10b) controlled in a coordinated and independent way so that said sabres (7) and stamping member (5) operate when the meat pieces are stopped and are withdrawn when the same are moving forwards.

17 Claims, 3 Drawing Sheets

U.S. PATENT DOCUMENTS

| | | | |
|---|---|---|---|
| 4,612,684 A | 9/1986 | Kollross | 452/35 |
| 4,644,607 A | 2/1987 | Sziede | 17/45 |
| 4,682,385 A | 7/1987 | Kasai et al. | |
| 4,761,854 A | 8/1988 | Schnell et al. | 17/1 R |
| 4,766,645 A | 8/1988 | Lamartino et al. | 17/49 |
| 4,880,105 A | 11/1989 | Kasai et al. | 198/465.4 |
| 4,997,365 A | 3/1991 | Lanham | 432/121 |
| 5,049,108 A | 9/1991 | Staudenrausch | 452/48 |
| 5,078,120 A | 1/1992 | Hwang | 126/21 A |
| 5,098,332 A | 3/1992 | Handel | 452/46 |
| 5,114,379 A * | 5/1992 | Prosenbauer | 452/142 |
| 5,277,301 A | 1/1994 | Fenty | 198/778 |
| 5,354,229 A | 10/1994 | Markwardt et al. | 452/51 |
| 5,354,230 A | 10/1994 | McFarlane et al. | 452/51 |
| 5,480,346 A | 1/1996 | Kasai et al. | 452/47 |
| RE35,259 E | 6/1996 | Williams | 126/369 |
| 5,788,563 A | 8/1998 | Nakamura et al. | 452/47 |
| 5,830,050 A | 11/1998 | Nakamura et al. | 452/31 |
| 5,850,786 A * | 12/1998 | Bifulco | 100/343 |
| 5,942,265 A | 8/1999 | Roberds et al. | 426/59 |
| 6,066,035 A | 5/2000 | Hergott et al. | 452/31 |
| 6,071,186 A | 6/2000 | Shibata et al. | |
| 6,213,368 B1 | 4/2001 | Vermeer et al. | 226/104 |
| 6,264,543 B1 * | 7/2001 | Garcia et al. | 452/141 |
| 6,277,018 B1 | 8/2001 | Cody et al. | 452/51 |
| 6,468,143 B1 | 10/2002 | White et al. | 452/32 |
| 6,523,462 B1 | 2/2003 | Johnson et al. | 99/443 C |
| 6,672,202 B1 * | 1/2004 | Volkl | 99/349 |
| 6,786,813 B1 | 9/2004 | Shefet et al. | 452/51 |
| 6,793,068 B1 | 9/2004 | Shefet et al. | 198/778 |
| 6,821,542 B1 | 11/2004 | Shefet | 426/512 |
| 2003/0148724 A1 | 8/2003 | Shefet et al. | 452/32 |
| 2003/0171084 A1 | 9/2003 | Shefet et al. | 452/35 |
| 2003/0171086 A1 | 9/2003 | Shefet et al. | 452/177 |
| 2003/0232587 A1 | 12/2003 | Shefet et al. | 452/183 |

FOREIGN PATENT DOCUMENTS

| | | |
|---|---|---|
| EP | 0399582 | 1/1990 |
| FR | 2.088.622 | 4/1970 |

OTHER PUBLICATIONS

Article, "Batch Ovens", Alkar, http://www.alkar.com (date unavailable; believed to be dated before Mar. 1, 2002) pp. 1-3.

Brochure, "Fessmann Turbomat 7000: Industrial Smoking and Cooking", Fessman Group (date unavailable; believed to be dated before Mar. 1, 2002) pp. 1-8.

Brochure, "Fessmann Smoking Cooking Cooling", Fessman Group (date unavailable; believed to be dated before Mar. 1, 2002) pp. 1-8.

Brochure, "Fessmann Transfer 4000: Continuous Smoking, Cooking and Cooling", Fessman Group (date unavailable; believed to be dated before Mar. 1, 2002) pp. 1-9.

Pictures of the inside of a conventional prior art oven from Alkar.

PCT International Search Report, International Application No. PCT/US03/04727 filed Feb. 20, 2003; mailed Dec. 5, 2003.

* cited by examiner

MACHINE FOR TENDERISING MEAT MORSELS

This is a nationalization of PCT/ES02/00127 filed Mar. 15, 2002 and published in Spanish.

This invention refers to a machine for tenderizing meat pieces through operations of stabbing and hammering thereof.

The machine of the present invention is useful for tenderizing meat pieces coming from a brine injection station in a premise for conditioning the meat pieces for preparing meat products such as hams and shoulder blades, and, in general, injected and cooked pork. Also, the machine of the present invention is useful for tenderizing not injected or pre-injected meat pieces.

In the art of the field of meat industry it is known to submit meat pieces as those above mentioned to a process including operations such as brine injection, massaging and macerating, among others, before proceeding to pack or stuff the finished product. One of such operations consists in stabbing the meat pieces or "tenderizing" them before their input to or output from a station of brine injecting such pieces, producing a great number of cuts in the muscle which increases the surface for withdrawing myofibrillar proteins, contributing to the decrease of the cooking loss, and to avoid the appearance of holes when cutting or slicing. Another usual operation consists in hammering the meat pieces in general after they have been injected and tenderized, improving this way the effects of stabbing them.

In the art of this field, machines for injecting brine are known which have associated a tenderizing group including a head, provided with a series of sabres, operated for repeatedly stab the meat pieces immediately after they passed through a brine injecting group. In this kind of machines, said head of the tenderizing group is coupled in general with same driving means as the injecting group, which provides an accurate synchronization between the actions of both groups. However, such an arrangement has the drawback that the needs of forward move speed and driving frequency of the injecting group are not the same as those of the tenderizing group which can give rise either to a meat piece not sufficiently injected with brine, if the machine is adjusted for a correct stabbing, or an excess of stabbing if the adjustment is carried out for porvidinig an accurate injection.

Injecting machines have been produced having a tenderizing group associated provided with independently controllable and adjustable independent driving means, but this add a significant complexity to a machine already enough complex by itself, apart from producing an increase of the external sizes of the machine which makes it little able to be located in limited spaces.

Also, independent tenderizing machines are known, provided with a bench and a conveyor belt which makes the meat pieces pass under a tenderizing group.

Hammering machines are also well-known, such as those disclosed in patents U.S. Pat. No. 3,413,681 and U.S. Pat. No. 5,785,589, this later to the present applicant, which comprises a longitudinal supporting floor provided with means to have the meat pieces intermittently moving forwards along it and a series of hammering groups, each provided with an independently driven stamping member to hit the meat pieces on said floor when they are stopped. This is a relatively simple and quite effective machine which usually receives the meat pieces previously injected and tenderized.

A purpose of the present invention is to gather the functions of a tenderizing machine and a hammering machine in a single compact machine adapted for tenderizing meat pieces previously injected with brine or not injected, using common structure, power supply and control means, and analogous but independent and independently controlled driving means so that it is possible to match the requirements of stabbing and hammering from a same forwards moving speed of the meat pieces along a supporting floor.

Another purpose of the present invention is to provide a light-weighed, compact design and easy to carry tenderizing and hammering machine, in order it is easy to move and incorporate to any suitable place in a meat piece conditioning premise as an auxiliary tenderizing element.

The machine according to the invention thus proposes to integrate at least one tenderizing group to a hammering machine of the kind disclosed in said patent U.S. Pat. No. 5,785,589 provided with one or more hammering groups adding very little complexity to it, which allows, for example, to make said tenderizing group independent from the injecting machine to which it was associated, reducing the complexity and the sizes thereof, and providing a new light-weighed and easy to carry tenderizing machine which provides a more advantageous combined treatment of the meat pieces as it will be seen below.

In the machine of the present invention, the driving and guiding means of the tenderizing group or groups are fully analogous to those of the hammering group or groups although they are independent and independently controlled in coordination with means for moving forwards meat pieces on a supporting floor. For this, control electronic means adjust at least the rates of forward moves and stops of the forward moving means and, depending on such rate, the operating strength, the sequence of the motions and the distribution of the times of the tenderizing and hammering groups, including the possibility that each independent group makes a single or several moves at each stop of the meat pieces. Said control and regulation electronic means in addition allow to selectively annul the operation of the hammering and/or tenderizing group or groups without preventing the normal operation of the moving forwards means and, if fit, of the remaining group or groups.

Preferably, in the machine of the present invention, the tenderizing group is located between the input and the hammering group or groups, so that the meat pieces are first stabbed and thereafter hammered. It is considered that in most of cases, a single tenderizing group and an single hammering group are sufficient, bearing in mind that they can be programmed to carry out more than one operation for each forwards move of the meat pieces. However, in given applications, it could be wished to have available more than one tenderizing group and/or more than one hammering group, therefore embodiments of the machine of the invention are possible which would be provided with two or more tenderizing groups and two or more hammering groups. However, the preferred exemplary embodiment is provided with a single tenderizing group and a single hammering group, which gives as a result a quite compact and light-weighed machine which can be mounted on a frame provided with wheels making it easy to be moved and easy to be incorporated to any point of a facility where it is considered temporarily necessary.

The combined action of stabbing and hammering the injected meat pieces supplied by the machine of the present invention produces a synergic effect between an increase of the surface for withdrawing myofibrillar proteins (stabbing)

an stretching the muscular fibres (hammering), as well as an increase of the interfibrillar free spaces, which allows a very quick and best fixation of the brine in said free spaces. This process provides a reduction of 10% to 50%, depending on the kind of product, of the total time of process including further treatments, such as massaging. This time reduction produces an increase of the productivity of the massaging machines and facilities. Also an increase on the cooking performance, a best performance when slicing the cooked meat products, that is to say, a decrease of the number of defective slices due to breakage or to the presence of hollow or badly adhered areas and a visible improvement in the texture of the meat and a best intermuscular link for, for example, the cooked meat products.

These and other advantages will be more apparent from the following detailed description of a preferred exemplary embodiment with reference to the accompanying drawings in which.

Figure 1:
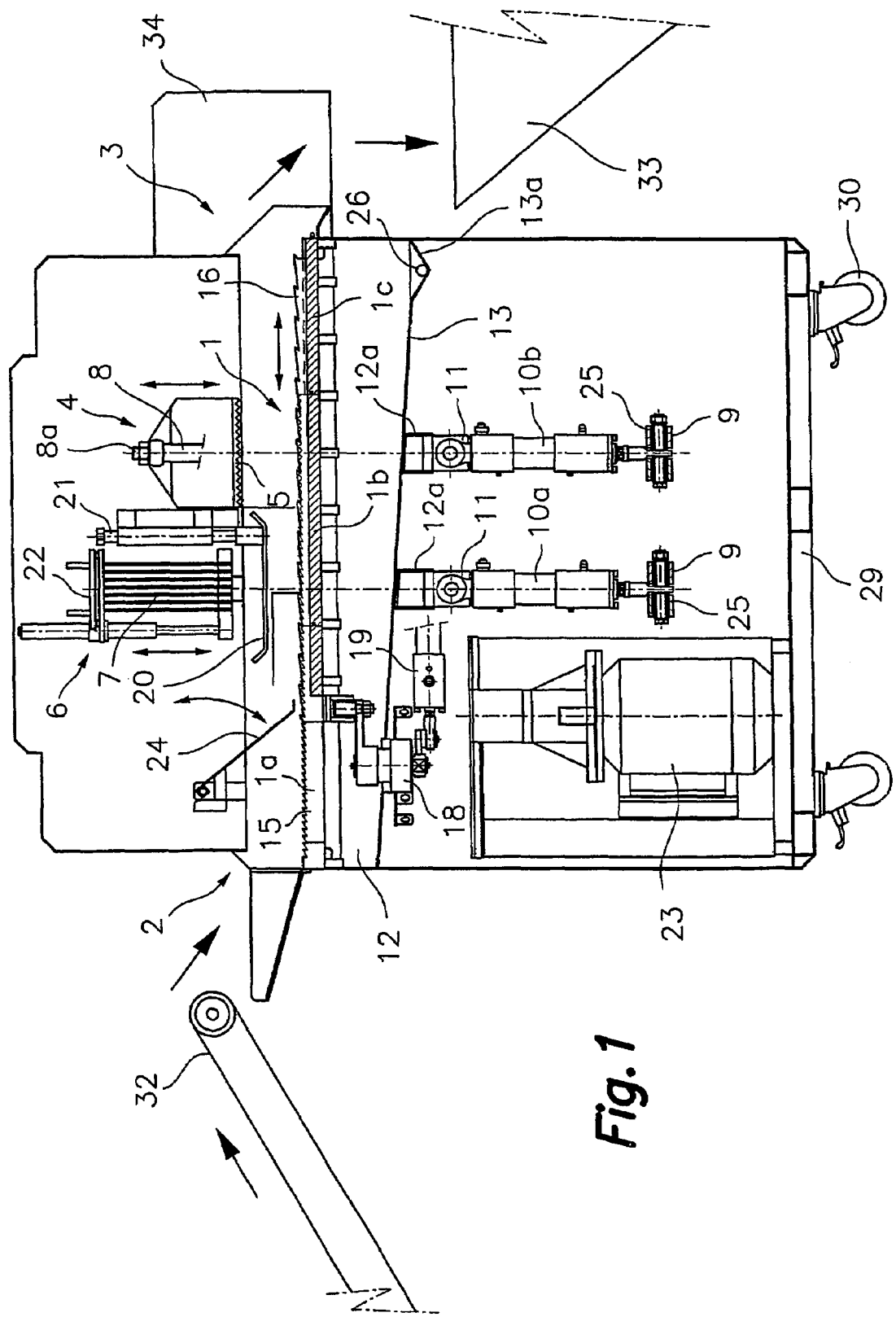
FIG. 1 is a schematic side elevation view of the machine for tenderizing meat pieces of the present invention, with some parts suppressed or partly sectioned for a best visibility.
Figure 2:
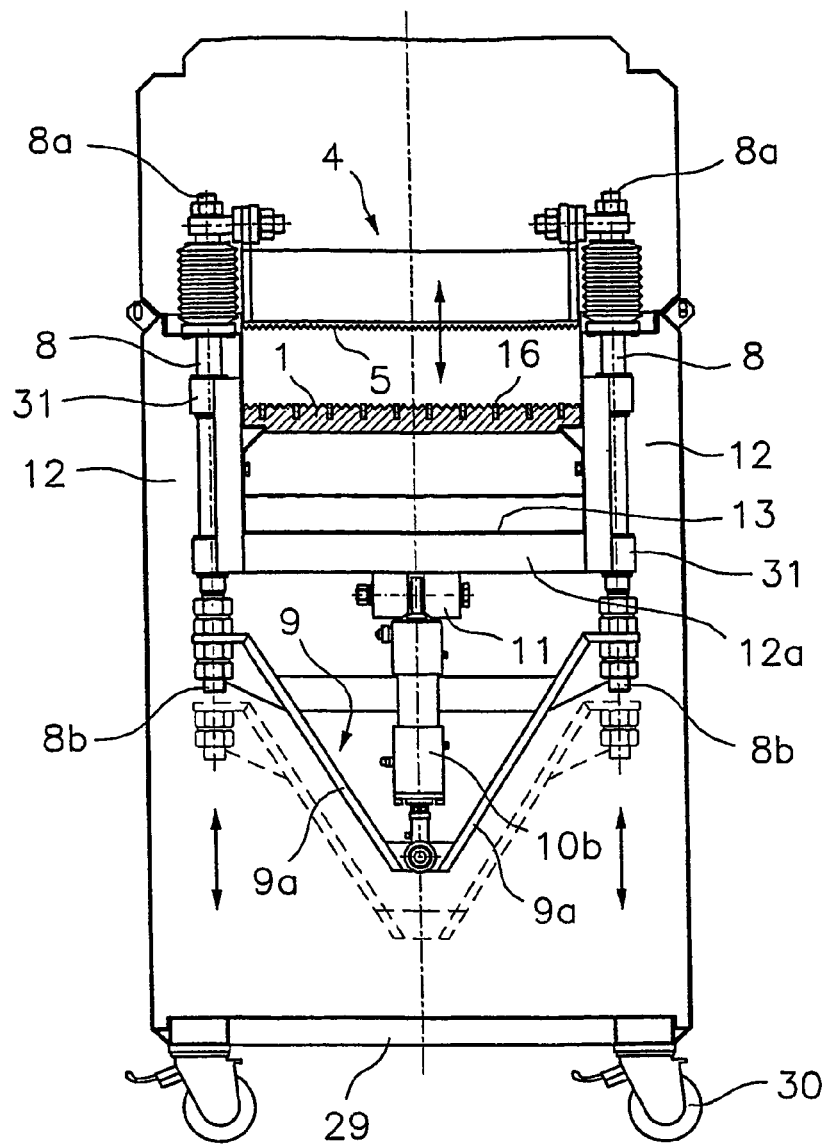
FIG. 2 is a schematic view in cross section of the machine of FIG. 1.

Initially referring to FIGS. 1 and 2, the machine essentially comprises a frame 29, preferably provided with idle wheels 30 to make easier the machine mobility, the frame 29 providing a bench 12 on which a longitudinal floor 1 is supported arranged between an input 2 for generally brine-injected meat pieces, and an output 3 of said pieces once tenderized. Associated to said floor 1 there is means for making said meat pieces to intermittently move forwards along said floor 1 between said input 2 and said output 3. In an intermediate area 1b of the floor 1 there is arranged a tenderizing group 6 and a hammering group 4. The tenderizing group 6 is arranged between the input 2 and the hammering group 4 so that the meat pieces pass first through the tenderizing group and then through the hammering group. Although it is considered that a single group of each kind is sufficient for most of the applications, it would be also possible to arrange several tenderizing groups and/or hammering groups in series on a longer intermediate area of the floor.

The tenderizing group 6 integrates a head 22 provided with a plurality of sabres 7 downwardly directed. This tenderizing group 6 is associated to second independent driving means 10a, independently controlled in coordination with first driving means 18, 19 of the meat piece intermittent forward moving means to have such head 22 going down and stabbing the meat pieces on the floor 1 by means of an adjustable and controlled pressure when said meat pieces are stopped, and to keep the head 22 high and with the sabres 7 withdrawn when the meat pieces are moving forwards. On its hand, the hammering group 4 is provided with a stamping member 5 associated to third independent driving means 10b, also independently controlled in coordination with said driving of the meat piece intermittent forwards moving means to have the stamping member 5 going down and hitting the meat pieces on the floor 1, also by means of an adjustable and controlled pressure, when said meat pieces are stopped and to keep the stamping member 5 withdrawn when the meat pieces are moving forwards.

The sabres 7 of the tenderizing group 6 are arranged in said head 22 in upright position, forming several rows aligned or offset from each other, said head 22 being easily dismountable so that it is possible to exchange different heads 22 with different kinds of sabres 7 and/or different arrangements of them as required for different products or different treatments thereof. Thus the sabres 7 can have, for example, an elongated cross sectional profile, having a convex bar shape, cross shape or a three or more points star, among others, and they can be arranged on a head 22 according to several patterns, for example, square, in quincunx, in rows, etc. to adapt themselves to the different kinds of meat products.

To prevent the trends the sabres 7 have to lift the meat piece dragging it upwards when they are withdrawn after stabbing it, the tenderizing group 6 has associated a plate 20 similar to an extractor, having through openings for such sabres 7, such plate 20 being situated stationary under the head 22 at a predetermined height above the floor 1. Said plate 20 is provided with adjusting means 21, such as a hand driven spindle to adjust said height thereof on the floor. With such arrangement, when the head 22 goes down, the sabres 7 pass through said openings of the plate 20 and penetrate in the meat piece stopped under the tenderizing group 6 and when thereafter the head 7 is withdrawn upwards, the plate 20 holds the meat piece by its top part while said sabres 7 are withdrawn, facilitating that they are detached from them and preventing that the meat piece is introduced in the area occupied by the sabres in its withdrawn position.

As well the hammering groups 4 as the tenderizing group 6 are transversally mounted on said floor 1 and are joined by their side ends to the top ends 8a of columns 8 arranged on both sides of said floor 1. Such columns 8 are mounted on sockets 31 (shown in FIG. 2) integral with the frame 12 so that columns 8 can move, linearly guided in a direction normal to the floor 1. Lower ends 8b of said columns 8 are fixed to respective crossbars 9 located under the floor 1, so that each group, together with its respective columns 8 and crossbar 9 form a moving square, linearly guided by their sides, through which such floor 1 is arranged. Said respective second and third driving means 10a, 10b of the hammering groups 4 and tenderizing group 6 are linked to said crossbars 9 so that selectively moving said crossbars 9 upwards and downwards a corresponding move of the head 22 and stamping member 5, respectively occurs. Said second and third driving means are fluid dynamic cylinders 10a 10b, preferably hydraulic cylinders, fixed by their ends to the centre of said crossbars 9 and by the other end to supports 11 integral with crossing bars 12a of said bench 12 of the machine, the longitudinal shafts of cylinders 10 being preferably in a position parallel to said columns 8, as it is shown in FIGS. 1 and 2. At least some of mentioned fastening devices between cylinders 10 and supports 11 and/or crossbars 9 are achieved through damping blocks 25 of elastic material or elastomer to reduce the effects of hammering or stabbing on the bench 12. In order to minimize the length of columns 8, crossbars 9 define V-shaped arms 9a which provide a space sufficient for the hydraulic cylinders 10 at same time columns 8 have only a free portion of length corresponding to the maximum displacement of the respective tenderizing group 6 and hammering group 4.

Under the floor 1 and on said crossing bars 12a, the bench 12 configures a container 13 having an inclined bottom to collect possible liquid substances from the meat pieces during the tenderizing operations. Thus, said hydraulic cylinders 10 remain arranged under said container 13 so that they are protected from said liquid substances. The container 13 comprises at its lowest end collecting tank 13a provided with a draining hole 26.

Figure 3:
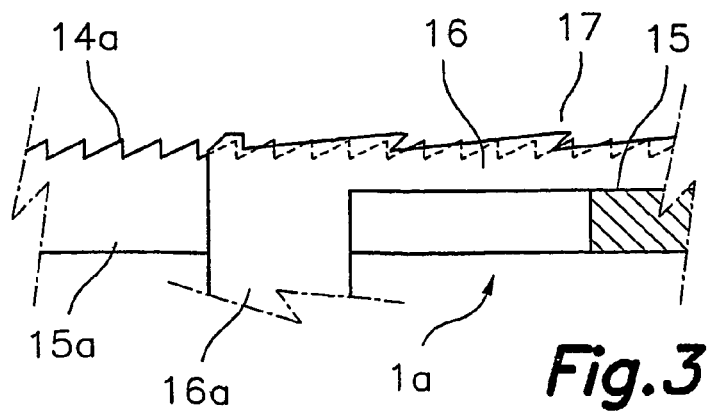
FIGS. 3 and 4 are enlarged details in cross section of different areas of the floor of the machine of FIG. 1 showing part of said means to make meat pieces intermittently move forwards.
Figure 4:
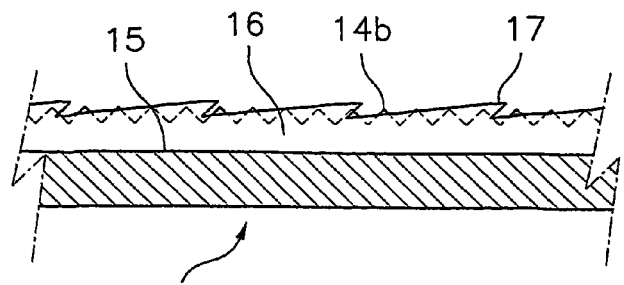
Figure 5:
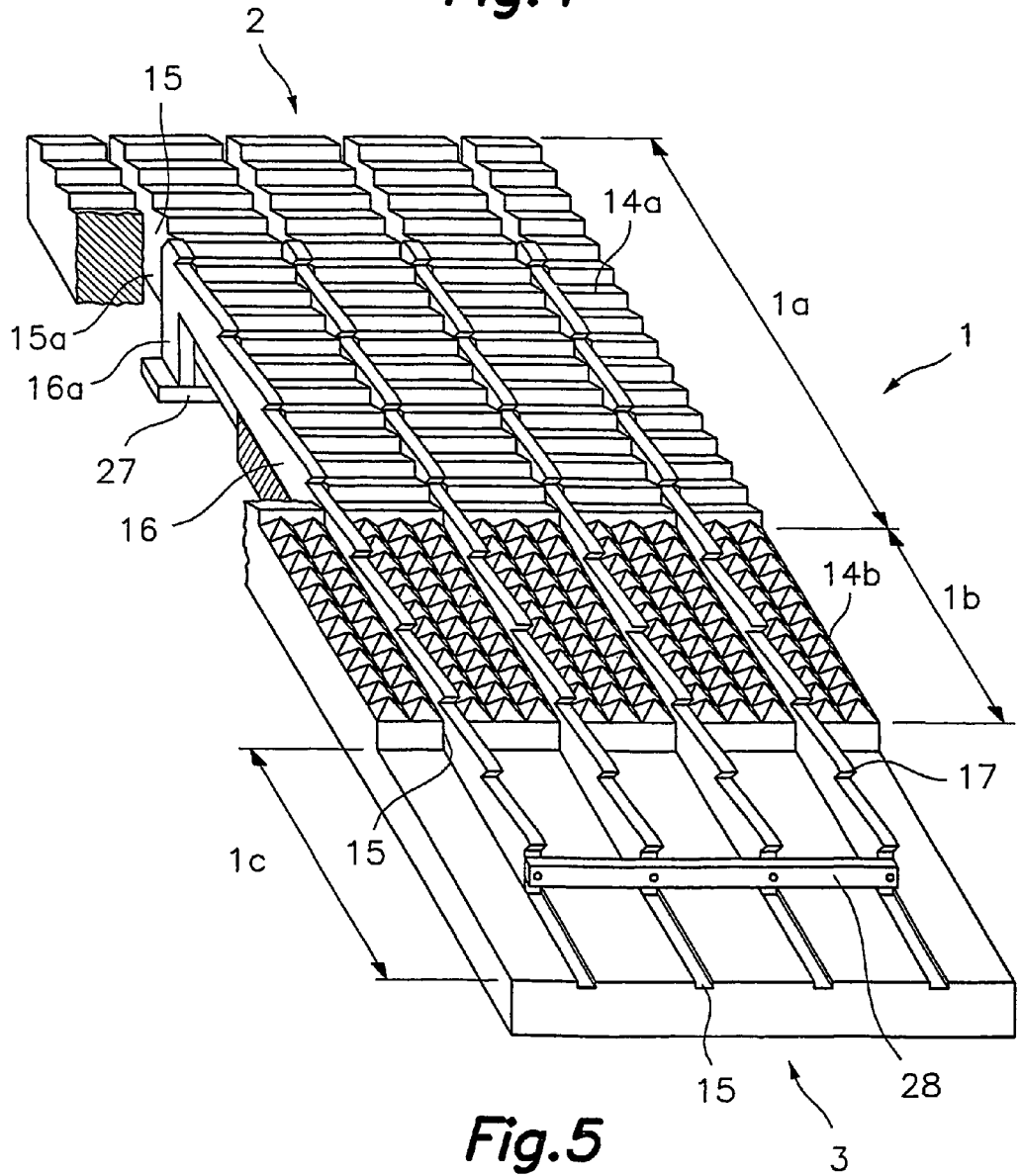
FIG. 5 is a perspective view, partly sectioned, of the full floor, showing its different lengths and the means to make the meat pieces intermittently move forwards on it.

Referring now to FIGS. 3 to 5, they show the floor 1 and the mentioned means intermittently advancing the meat pieces along it. The floor 1 comprises a plurality of longitudinal parallel grooves 15, through which are moving, sliding in an alternating movement, longitudinal bars 16 having a top oblique sawtooth-shaped profile 17 the ends of which are protruding above pointed protrusions 14a, 14b (the characteristics of configuration of which are detailed below) formed in some lengths of the top surface of said floor 1. Said longitudinal bars 16 constitute, in collaboration with said pointed protrusions 14a, 14b, the mentioned means to make the meat pieces intermittently moving forward along the floor 1. Said obliquity of the sawtooth 17 is very sharp in the forward direction of the meat pieces, so that, when the longitudinal bars 16 are moving forwards, said teeth 17 bite the lower part of the meat pieces dragging them forwards while when the bars 16 are moving back, the teeth 17 slide under the meat pieces, which remain still with the cooperation of said static pointed protrusions 14a, 14b of the floor 1. Said crossing bars 16 are joined to each other by at least a first crossbar 27 and connected to a transmitting mechanism 18, driven by said first driving means 19 to confer to the longitudinal bars 16 said alternating movement together.

As shown in FIG. 5, said top surface of the floor 1 advantageously comprises at least three steps differentiated according to the requirements at the different areas of the machine they are occupying, That is to say: a length of input and tenderizing 1a; a length of hammering 1b; and a length of output 1c.

Occupying an area adjacent to the input 2 and an area under the tenderizing group 6 there is said input and tenderizing length 1a, and it has the function of moving the meat pieces received through the input 2, where they arrive carried, for example, by a conveyor belt 32, to the tenderizing area and to support the meat pieces at said tenderizing area where they are stabbed and to make them thereafter move forwards to the hammering area. For this, the top surface of the input and tenderizing length 1a comprises a toothed configuration forming cross edges which constitute said pointed protrusions 14a. FIG. 3 shows the profile of the longitudinal section of the length 1a which shows an oblique sawtooth-shape directed forwards in which the pointed protrusions 14a correspond to said cross edges. Such pointed protrusions 14a having the shape of oblique saw teeth allow that the meat pieces go forwards dragged by the likewise oblique teeth 17 of the longitudinal bars 6, when they are moving forwards and hold the meat pieces, preventing that they move back, when the longitudinal bars 6 are moving backwards. It must be noted that the longitudinal bars 16 are not concealed when they comes back but that the smoothest slope of the faces of the teeth 17 slide under the meat pieces while they are retained by the edges 14a during said backwards move. Near to said input 2 of the machine, on the input and tenderizing length 1a a gate 24 is arranged which is hinged at its top part so that it tends to remain in closed position simply by gravity. Such gate 24 is open by the meat pieces themselves when they are dragged by the bars 16.

At a part near to the input 2 of this input and tenderizing length 1a, said grooves 15 are communicated at the bottom with slots 15a for allowing the passage through the floor 1 of appendages 16a of the longitudinal bars 16 which are protruding at the bottom of the back ends thereof. Said appendages 16 are fixed to said first crossbar 27 which is driven by the first driving means 18, 19 of the intermittent forward move of the meat pieces. Such first driving means comprise a fluid dynamic cylinder 19 connected to said transmitting mechanism 18 which comprises at least a cranked handle the end of which acts in a slide fixed along the first crossbar 27.

The following length of the floor 1 is the hammering length 1b which includes an area where the hammering group 4 operates and comprises a top surface configured as a plurality of adjacent pyramids, arranged in the areas of the floor 1 located between the grooves 15. Such pyramids operate as a lower countermould supporting the meat pieces under the stamping member 5. The vertexes of such pyramids, as it can best be seen in FIG. 4 constitute said pointed protrusions 14b, which have a symmetric profile and less sharp than the edges 14a of the input and tenderizing length 1a. However, said pointed protrusions 14b, less sharp, are sufficient to produce the stretching of the muscular fibres and to hold the meat pieces during the backwards move of the longitudinal bars 6, as such in hammering length 1b the meat pieces are pressed against the top surface of the floor 1 by the hammering group 4.

Last, between the hammering and output area 3 is located said output length 1c which is smooth, that is to say, is lacking of pointed protrusions and shows a top surface arranged at the level of the bottom of the grooves 15 or close to them, so that at such output length 1c the front ends of the longitudinal bars 16 remain free and are connected to each other by means of a second crossbar 28 which stiffens the moving assembly of the longitudinal bars 16. The function of said output length 1c is to carry the meat pieces from the hammering length 1b to the output 3 where they fall by gravity, for example, to a input hopper 33 of a output conveyor or a machine for carrying out a subsequent treatment. Preferably, an external space immediately close to the output 3 is enclosed by each part less by the lower face by means of a protecting housing 34.

It must be pointed out that, with such arrangement, the floor 1 is sealed on all its length, because the grooves 15 are blind, except in that part of the input and tenderizing length 1a close to the input 2, in which, as it has been said, the grooves 15 are communicated with the slots 15a.

Preferably all the operations of the machine, that is to say, said driving means for the to and from move of the longitudinal bars 16 and said second and third driving means of the hammering group 4 and tenderizing group 6, are carried out by means of hydraulic cylinders 19, 10 for which operation the machine includes a station of hydraulic fluid supply 23 and control and regulation electronic means independent from each of said first, second and third driving means, being adjustable at least the rate of forwards moves and stops of the forward moving means and, according to said rate, the operating strength, the sequence of the moves and the distribution of the forwards move and backwards move distribution and the times of staying still, as well at the operating positions as at the withdrawn positions, of the tenderizing group 6 and hammering group 4, including the possibility of single or multiple moves of each group at each stop of the meat pieces.

It must be pointed out that said controlling and regulating electronic means make possible to selectively annul the operation of the hammering group 4 and/or the tenderizing group 6 allowing however the normal operation of the forwards moving means and, if fit, of the rest of the group, so that the machine can act either only as a hammering machine or only as a tenderizing machine, with a first tenderizing action followed by a hammering action or even in some cases as a simple conveyor link.

The invention claimed is:

1. Machine for tenderizing meat pieces, said machine comprising:
   a bench on which a longitudinal floor is supported, said longitudinal floor being arranged between an input and an output for generally injected meat pieces;
   means driven by first driving means and a transmitting mechanism for making said meat pieces intermittently move forward along said floor; and
   at least one hammering group provided with a stamping member, said hammering group being driven by second driving means independently controlled for making said stamping member hit the meat pieces on the floor when the meat pieces are stopped under said stamping member and to keep the stamping member withdrawn when the meat pieces are moving forwards,
   at least one tenderizing group comprising a head provided with a plurality of protruding sabres, said tenderizing group being driven by third driving means independently controlled for making said sabres stab the meat pieces on the floor when the meat pieces are stopped under said head and to keep said sabres withdrawn when the meat pieces are moving forwards.

2. Machine, according to claim 1, wherein said tenderizing group is arranged between said input and said at least one hammering group.

3. Machine, according to claim 2, further comprising one or more additional hammering groups, said additional hammering groups are arranged between said hammering group and said output, each additional hammering group being driven by independent driving means independently controlled.

4. Machine, according to claim 1, wherein said sabres are arranged in said head in a vertical, downwardly directed position and forming several rows aligned or offset from each other, said head being exchangeable with other heads having different kinds of sabres and/or different arrangements thereof.

5. Machine according to claim 4, wherein said tenderizing group has an associated plate acting as an extractor, said plate having through openings for said sabres, said plate being located stationary under the head at a predetermined height from the floor, regulating means provided for regulating said predetermined height of the plate above the floor, so that the plate holds the meat piece at a top part when said sabres are withdrawn after a stabbing action, making their detachment easier.

6. Machine, according to claim 1, wherein both the at least one hammering group and the tenderizing group are mounted transversely to said floor and each joined at side ends to top ends of columns linearly guided at one and the other sides of said floor and in a normal direction, lower ends of said columns are fixed to a crossbar located under the floor, said second and third driving means are linked to respective ones of said crossbars.

7. Machine, according to claim 6, wherein said second and third driving means are fluid dynamic cylinders, each attached at one of its ends to the centre of its respective crossbar and at the other end to a support integral with said bench, with its longitudinal axis in a position substantially parallel to said columns.

8. Machine, according to claim 7, wherein at least some of said attachments of the fluid dynamic cylinders to the crossbars and supports are carried out through damping blocks of elastic material.

9. Machine, according to claim 7, wherein said supports are located adjacent to the lower part of a container configured by the bench under the floor so that said hydraulic cylinders are arranged between said container and said crossbars which define V-shaped arms minimizing the length of the columns.

10. Machine according to claim 1, wherein said bench configures a container having an inclined bottom and arranged under the floor to collect possible liquid substances from the meat pieces during the tenderizing operations, said container comprising a collecting tank at its lower end provided with a draining hole.

11. Machine, according to claim 1, wherein said floor comprises at least a length provided with pointed protrusions and a plurality of longitudinal, parallel grooves, through which are sliding in an alternating movement longitudinal bars having an oblique sawtooth top profile protruding above said pointed protrusions, said longitudinal bars constituting said means for making the meat pieces intermittently move forward along the floor, said longitudinal bars being joined to each other by at least a first crossbar and connected to a transmitting mechanism driven by said first driving means for conferring said alternating movement to the longitudinal bars.

12. Machine, according to claim 11, wherein said floor comprises:
   an input and tenderizing length occupying an area adjacent to the input and an area where the tenderizing group is operating, in which input and tenderizing length said pointed protrusions are cross top edges formed with a configuration having a longitudinal section of oblique sawtooth, forwardly pointed, of the surface of said input and tenderizing length and, in said area adjacent to the input said grooves are communicated at the lower part with slots to allow the passage through the floor of appendages which are protruding at the bottom of the back ends of the longitudinal bars, said appendages being fixed on said first crossbar which is driven by said first driving means;
   a hammering length occupying an area where the hammering group is acting, where said pointed protrusions are the vertexes of a plurality of symmetric, adjacent pyramids, configured on the surface of said hammering length between the grooves; and
   an output length occupying an area between the hammering group and the output which is smooth, lacking of pointed protrusions and with a top surface arranged at the level of the bottom of the grooves or close to it.

13. Machine, according to claim 12, wherein said ends of the longitudinal bars corresponding to said output length of the floor are connected to each other by a second crossbar.

14. Machine, according to claim 12, wherein said first driving means comprise a fluid dynamic cylinder and said transmitting mechanism comprises at least a cranked handle the end of which is operating as a slide fixed along the first crossbar.

15. Machine, according to claim 1, wherein at least said first, second and third driving means of the moving forwards means, hammering group and tenderizing means, respectively, are corresponding hydraulic cylinders, for the operation of which the machine includes a station for hydraulic fluid supply and independent controlling and regulating means for each of said driving means, at least the rate of forwards move and stop of the moving forwards means being adjustable and, depending on said rate, the operating strength or pressure, the sequence of moves and distribution of times of the tenderizing group and hammering group includes the possibility of a single or a multiple operation of each group at each stop of the meat pieces.

16. Machine, according to claim 15, wherein said controlling and regulating electronic means allow to selectively annul the operation of the hammering group and/or that of the tenderizing group allowing the normal operation of the forwards moving means.

17. Machine, according to claim 16, wherein said bench is mounted on a frame provided with idle wheels.

* * * * *